United States Patent [19]

Nolf et al.

[11] 4,409,426
[45] Oct. 11, 1983

[54] SPLICE CASE

[75] Inventors: Jean-Marie E. Nolf, Hamme-Mille; Marc Verschelde, Waregem, both of Belgium

[73] Assignee: N.V. Raychem S.A., Kessel-lo, Belgium

[21] Appl. No.: 343,254

[22] Filed: Jan. 27, 1982

Related U.S. Application Data

[63] Continuation of Ser. No. 87,337, Oct. 23, 1979, abandoned.

[30] Foreign Application Priority Data

Oct. 27, 1978 [GB] United Kingdom ............... 42194/78

[51] Int. Cl.³ ............................................ H02G 15/32
[52] U.S. Cl. .............................. 174/21 R; 174/77 R; 174/DIG. 8; 428/36
[58] Field of Search .......... 174/77 R, 92, 93, DIG. 8, 174/21 R; 428/36

[56] References Cited

U.S. PATENT DOCUMENTS

| | | | |
|---|---|---|---|
| 2,027,962 | 1/1936 | Currie | 18/55 |
| 2,978,533 | 4/1961 | Colbert | 174/93 |
| 3,086,242 | 4/1963 | Cook et al. | 18/1 |
| 3,379,218 | 4/1968 | Conde | 138/99 |
| 3,455,336 | 7/1969 | Ellis | 138/156 |
| 3,542,077 | 11/1970 | Muchmore | 138/99 |
| 3,663,740 | 5/1972 | Dellett | 174/92 |
| 3,678,174 | 7/1972 | Ganzhorn | 174/84 R |
| 3,770,556 | 11/1973 | Evans | 161/39 |
| 3,957,382 | 5/1976 | Greuel et al. | 403/27 |
| 4,016,356 | 4/1977 | McLoughlin | 174/35 R |
| 4,035,534 | 7/1977 | Nyberg | 156/86 |
| 4,085,286 | 4/1979 | Horsma et al. | 174/92 |
| 4,135,587 | 1/1979 | Diaz | 174/92 |
| 4,142,592 | 3/1979 | Brusselmans | 174/92 |
| 4,144,404 | 3/1979 | De Groef et al. | 174/88 |
| 4,168,192 | 9/1979 | Nyberg | 156/86 |
| 4,177,376 | 12/1979 | Horsma et al. | 219/553 |
| 4,179,320 | 12/1979 | Midgley et al. | 156/86 |
| 4,194,082 | 3/1980 | Campbell | 174/74 |
| 4,194,750 | 3/1980 | Sovish et al. | 277/208 |
| 4,203,000 | 5/1980 | Muller | 174/77 R |
| 4,246,687 | 1/1981 | Nolf | 174/DIG. 8 |
| 4,268,041 | 5/1981 | Sovish et al. | 264/250 |
| 4,268,329 | 5/1981 | Jervis | 156/51 |
| 4,298,415 | 11/1981 | Nolf | 156/86 |
| 4,350,842 | 9/1982 | Nolf | 174/92 |
| 4,361,722 | 11/1982 | Kunze et al. | 174/93 |

FOREIGN PATENT DOCUMENTS

| | | |
|---|---|---|
| 1245119 | 9/1971 | United Kingdom . |
| 1329611 | 9/1973 | United Kingdom . |
| 1353752 | 5/1974 | United Kingdom . |
| 1545128 | 10/1977 | United Kingdom . |

Primary Examiner—William R. Dixon, Jr.
Attorney, Agent, or Firm—Lyon & Lyon

[57] ABSTRACT

A heat-recoverable sleeve for enclosing splices or joints in pressurized cables or supply lines is given increased resistance to peeling away from the cable or line by insertion of auxiliary means, preferably a U- or V-shaped flexible strip, which may be heat-recoverable, between the sleeve and the cable or supply line. The ends of the strip are preferably closed and are preferably overlapped and bonded to each other when the strip is placed around the cable or supply line. A release foil may be positioned inside the U- or V-shape of the strip to resist bonding together of the opposed arms thereof, and the foil may carry adhesive to bond it to one of the arms and may protrude beyond the ends of the arms so that the foil adhesive can help to locate the strip on the cable or supply line.

18 Claims, 10 Drawing Figures

SPLICE CASE

This is a continuation of application Ser. No. 87,337, filed Oct. 23, 1979, now abandoned.

DESCRIPTION

This invention relates to sealing articles and their use in the insulation and protection of substrates such as supply lines.

Heat-recoverable articles, especially heat-shrinkable articles, are now widely used in many areas where insulation, sealing and encapsulation are required. Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,957,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat unstable form in a separate stage.

In other articles, as described, for example, in British Pat. No. 1,440,524, an elastomeric member such as an outer tubular member is held in a stretched state by a second member, such as an inner tubular member, which, upon heating, weakens and thus allows the elastomeric member to recover.

Heat-shrinkable sleeves find many applications, especially in the connection and termination of wires, cables and pipes. However, there are other applications where it is desirable to provide a connecting, insulating or protective heat-recoverable member for elongate objects such as cables and pipes where the ends are not accessible or, if they are accessible, where it is undesirable to disconnect or otherwise displace them. For such applications so-called "wrap-around" sleeves have been developed. Basically these are heat-recoverable sheets which can be wrapped round the substrate to form a generally tubular shape and which, in general, are provided with fastening means for holding them in the wrapped-up configuration during recovery. Typically such fastening means are mechanical in nature and comprise, for example, rigid clamps, pins or channel members which co-operate with suitably shaped moulded or extruded protuberances adjacent to the overlapping edges of the heat-recoverable sheet. Various types of fastening means are described, for example, in U.S. Pat. No. 3,379,218 and British Pat. Nos. 1,155,470; 1,211,988 and 1,346,479. In other applications, however, the sheet may be held in the wrapped-up configuration during recovery by means of an adhesive which may, in some cases, be applied on site.

Heat-recoverable sleeves and wrap-around sleeve have been successfully employed in many fields of application. One particularly important field in which they are employed is in the protection of communication system cables. Such cables must periodically be spliced to connect successive portions and to provide access for branch cables and terminals. At the splices so effected the protected sheaths must be disturbed thus providing an opportunity for moisture and other contaminants to reach and damage or destroy the unprotected conductors and the splice. For this reason splice cases have been developed to protect and seal the splice and the cable ends. Especially useful splice cases and materials and components for use therein are described, for example, in German OS Nos. 2,543,338, 2,543,314, 2,543,346, 2,635,000 and 2,539,275. Another important type of splice case is described and claimed in U.S. Pat. No. 4,142,592, the disclosure of which is incorporated herein by reference.

The splice cases mentioned above have proved extremely successful in practice in many types of cables including, especially, pressurised cables, i.e. those in which a small pressure of, for example, up to about 2 $kg/cm^2$, typically about 0.5 $kg/cm^2$, is maintained in order to prevent the ingress of water through a damaged cable jacket. The application of splice cases to such pressurised cables is discussed in the Patents mentioned above and also in U.S. Pat. No. 4,268,329, the disclosure of which is incorporated herein by reference, and in German OS No. 2,638,448.

Such splice cases are provided with outer heat-recoverable sleeves which are shrunk down over the splice when the latter has been completed. It will be appreciated that the ends of the heat-shrinkable sleeve, which may be a wrap-around sleeve, are shrunk down firmly over the cables forming the splice and, for this purpose, they are generally provided with a heat activatable adhesive to provide a good seal to the cables. However, the presence of the splice case itself precludes the central portion of the heat-recoverable sleeve from complete recovery and, therefore, in a pressurized cable the pressure within the splice case tends to force the heat-recoverable sleeve away from the cables and, in particular, puts the adhesive layer in the region at which the heat-recoverable sleeve first contacts the cable under considerable strain, rendering it liable to failure by peel. A further complication is that the counteracting recovery force of the heat-recoverable sleeve tends to relax with time down to some limit value. Failure can, in general, be avoided by, for example, ensuring that a sufficient length of heat-recoverable sleeve is shrunk down on each cable and by other measures such as solvent cleaning of the cable jackets, abrasion of the jacket surfaces and flame brushing and, at the relatively low pressures employed to date the splices have readily met the test requirements of the users. However, at slightly higher pressures, which are now proposed for use in pressurised cables, the problem becomes more severe, especially bearing in mind that the expected life time of the joints is from 20 to 30 years and in view of the fact that, in practice, cable preparation is dependent upon the skill of the operator. It will, in any case, be appreciated that similar problems may arise in other applications in which external or internal forces may tend to cause the sleeve to come out of contact with the substrate.

The present invention provides a method of recovering a heat-recoverable article on or about a substrate, wherein there is interposed between the article and the substrate at least one flexible auxiliary member which is adapted to eliminate or to reduce the effect of a force tending to cause the heat-recoverable article to be brought out of contact with said substrate.

By "flexible" we mean able to be deformed by a force which will, in the absence of the member, lead to the article being brought out of contact with the substrate. In general, therefore, the article will be deformed to enhance the contact of its surfaces with the member and the substrate. Accordingly, while the member is to be responsive to such forces it should not itself be rupturable or caused to flow thereby at least when interposed between the article and the substrate.

As will be appreciated that the following discussion, the invention is generally applicable to any use of heat-recoverable articles including, for example, those in which the article is a heat-expansible article which is adapted to contact the inner surface of a utility line such as a duct. Reference is made in this respect to British Patent No. 1,245,119. Reference is also made to U.S. Pat. Nos. 4,194,750 and 4,268,041, the disclosures of which are also incorporated herein by reference. It will also be appreciated that the concept of the present invention may be applicable to situations in which no heat-recoverable article is used but in which, nonetheless, forces derived from internal pressure or some other cause tend to put an interface in danger of failure by peel.

However, for convenience, the invention will now be described in more detail with reference to the use of heat-shrinkable sleeves in the protection of splices in pressurised cables.

Accordingly, the essence of one aspect of the present invention is to provide one or more auxiliary members which isolate the interface region from the forces which would otherwise tend to cause peel at the interface and which, preferably, do so by themselves accommodating those forces. In one embodiment of the present invention the auxiliary member presents to such forces a re-entrant or concave surface, and preferably the member comprises a strip of generally U- or V-shaped cross-section, the base of which lies at or adjacent the interface between the heat-shrinkable sleeve and the cable and the arms of which are attached, e.g. by adhesive, to the heat-shrinkable sleeve and the cable jacket, respectively, in the direction of the splice. The strip is preferably flexible at least insofar that it is able to respond to pressure by opening out, so as to enlarge the U or V. Thus the strip may, for example, be made from a flexible polymeric material, cross-linked polyethylene being especially preferred or may, in some applications, be hinged at its base, this being achieved for example by the provision of a relatively flexible region at the base of an otherwise relatively rigid strip. If desired the strip may be reinforced along its length so as to provide it with some structural strength and, in certain applications it may be desirable to provide it with further reinforcement at spaced apart regions along its length.

The strip may be provided as a continuous length which is cut to size and wrapped around the circumference of the cable or may be provided as standard size lengths for this purpose; for large diameter cables it may be appropriate to use two or more of such standard size lengths. In other embodiments it may be appropriate to provide the U- or V-shaped strip as a continuous annular member which is positioned around the cable. The strip may, for example, be moulded or extruded. In all cases the strip can, if desired, itself be heat-recoverable so that it can be caused to recover and firmly grip the cable. The material of the strip should preferably be non-meltable below about 180° C. and should be capable of adhering to the hot melt or other adhesives commonly employed in splicing. It should also be sufficiently thick that it does not tear or crack under the strains and pressures involved. Cross-linked flat polyethylene sheet having a thickness of 0.3 to 0.5 mm is particularly suitable.

In those applications where the strip is to be wrapped around the cable it will be necessary for the ends to overlap and the length of the strip is, therefore, preferably, from 1.25 to 1.75 times that of the circumference of the cable jacket. In order properly to secure the overlapping ends of the strip to each other, the side walls of each end of the strip are preferably bonded together, for example, by peroxide so as to provide flat end portions which are themselves bonded to each other in the overlapping region. As mentioned above, in some cases, it may be desirable to use two lengths of strip in order to form an annular member about the circumference of the cable. Once again, the overlapping ends of the strips will preferably be flattened to facilitate bonding. In all embodiments it will be advantageous to mark the strips so as to indicate to the operator where the minimum region of overlap should occur. The strip may, for example, be provided with a coloured region where overlap is to occur. In some embodiments the strip may form part of the heat-recoverable sleeve itself, i.e. it may be an integral moulded part of the heat-recoverable sleeve or may be attached to the inner surface thereof prior to recovery. However, in presently preferred embodiments the strip is provided as a separate member which becomes attached to the inside of the heat-recoverable sleeve by adhesion with the hot melt or other adhesive provided on the inner surface thereof. The other side of the strip is itself preferably provided with an outer layer of the same or a similar adhesive for adhesion to the cable. In some cases it may be preferable to use a mastic which may give better wetting and sealing at low temperatures and allow less cable preparation.

It will be preferable to provide means for maintaining the strip in the desired position during recovery. In this respect it may be possible, as mentioned above, to provide a heat-recoverable strip which is initially shrunk onto the cable. In other embodiments the strip may itself be resilient, e.g. made from a natural or synthetic elastomer or may be provided with a resilient component such as a coil spring in order to grip the cable. However, the strip may advantageously be retained in position by providing a material coated with a contact adhesive which adheres to the side of the U- or V-shaped strip adjacent the cable and to the cable itself. Such a material may, for example, be a tape of thin foil provided on its upper surface with a release agent (in order to prevent the two sides of the U- or V-shaped strip from sticking together) and on its lower side with a contact adhesive.

In all embodiments of the present invention it will be preferred to provide some means to ensure that the sides of the U- or V-shaped strip do not stick together and, in this respect, it may be appropriate to provide a release foil as an insert between the said sides. It may also be desirable for the release foil to extend some distance, for example about 15 mm, from the edge of the strip towards the splice, in order to prevent the sleeve from sticking to the cable jacket between the strip and the splice.

It will be appreciated that the present invention may be used in many applications and, in particular, is not limited to applications in which the heat-recoverable article is a simple heat-shrinkable tubular sleeve. Thus it may, for example, be used where branch-off connections are being made, and in this respect, is suitable for use together with the clips and fork members described and claimed in U.S. Pat. Nos. 4,298,415 and 4,246,687, respectively, the disclosures of which are incorporated herein by reference.

Suitable materials and adhesives for use in the method of the present invention are described in the various Patents referred to herein and will, in any case, be known to those skilled in the art.

The present invention also provides auxiliary members, especially the above described U- or V-shaped strips, for use in the method of the present invention. For example, the invention provides a flexible auxiliary member for use in recovering a heat-recoverable article on or about a substrate, said member being adapted to be interposed between the article and the substrate and comprising a strip of generally U- or V-shaped cross-section coated on at least one exterior surface by an adhesive or a mastic.

In another aspect, the invention also provides a splice in a pressurised cable or a joint in a pressurised supply line protected by a sleeve provided with one or more flexible auxiliary members interposed between the sleeve and the cable or supply line and so positioned as to present a re-entrant or concave surface to the forces generated by the internal pressure of the cable or supply line such that the forces which would otherwise tend to cause peel at an interface between the sleeve and the cable or supply line are reduced or eliminated. The invention also provides a kit of parts comprising a sleeve and an auxiliary member as aforesaid for protecting a splice in a pressurised cable or a joint in a pressurised supply line.

Various embodiments in accordance with the present invention will now be described, by way of example only, with reference to the accompanying drawings, in which.

Figure 1:
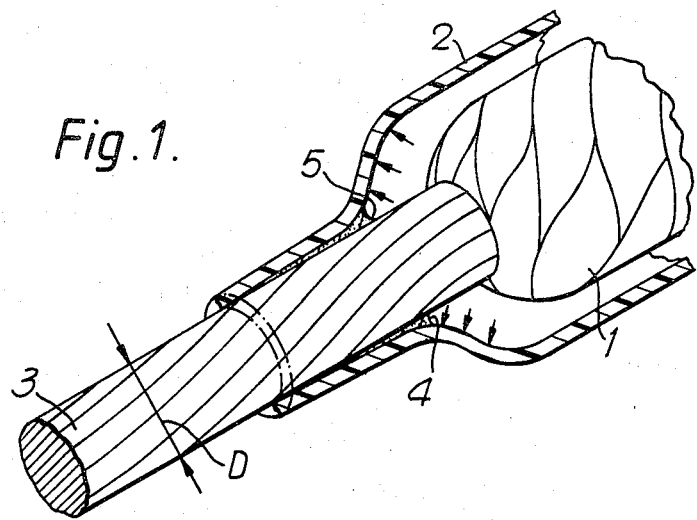
FIG. 1 is a longitudinal cross-section through one end of a conventional cable splice.

Referring now to the drawings, in FIG. 1 there is shown an end portion of a protected splice made by a conventional method such as, for example, one of those described in the patents referred to above. As can be seen, the splice 1 (which is not shown in detail) is protected by a heat-recoverable sleeve 2 which is shrunk, at the end shown, about cable 3. The pressure within the cable indicated by the arrows tends to cause failure of the bond between the sleeve 2 and the cable 3, especially at interface 4. A hot melt adhesive 5 is typically provided on the inner surface of the sleeve 2 at least in those regions in which it contacts the cable 3.

Figure 2:
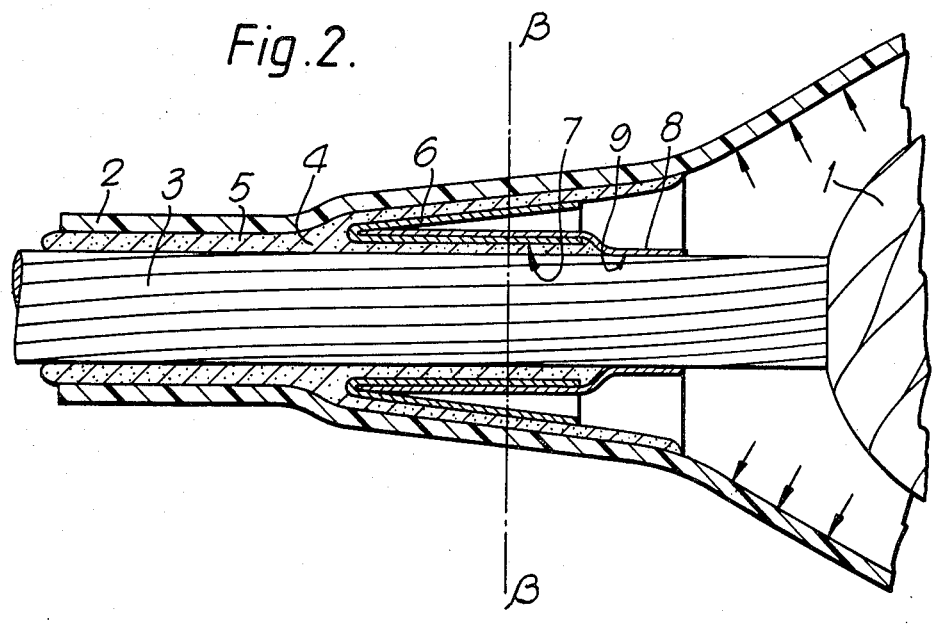
FIG. 2 is a longitudinal cross-section through one end of a protected cable splice.

In FIG. 2 there is shown an arrangement in accordance with the present invention in which a V-strip 6 made from cross-linked polyethylene is positioned between the sleeve 2 and the cable 3 so that the base thereof lies at or adjacent the interface 4.

Figure 3:
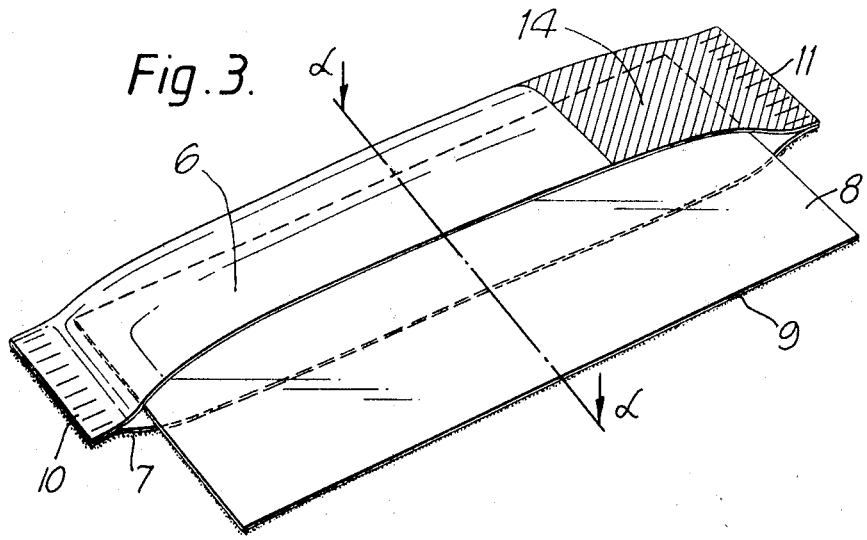
FIG. 3 shows a V-strip as used in the arrangement shown in FIG. 2.
Figure 4:
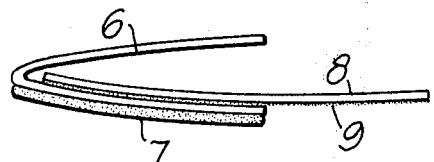
FIG. 4 is a cross-section along the line α—α of FIG. 3.

As is shown more clearly in FIGS. 3 and 4 the V-strip 6 is provided on its lower side with a layer of hot melt adhesive or mastic 7 and on its upper side is contacted by the hot melt adhesive layer 5 provided on the inner surface of the sleeve 2. In order to secure the V-strip in position prior to recovery it is also provided on the upper surface of its lower side with a silicone foil tape 8 which is itself provided with a lower layer of contact adhesive 9. As is shown most clearly in FIG. 3 the ends of the V-strip 10 and 11 are closed, for example by bonding with a peroxide and, as is shown most clearly in FIG. 6 the overlapping ends are secured together so as to give a degree of overlap.

Figure 5:
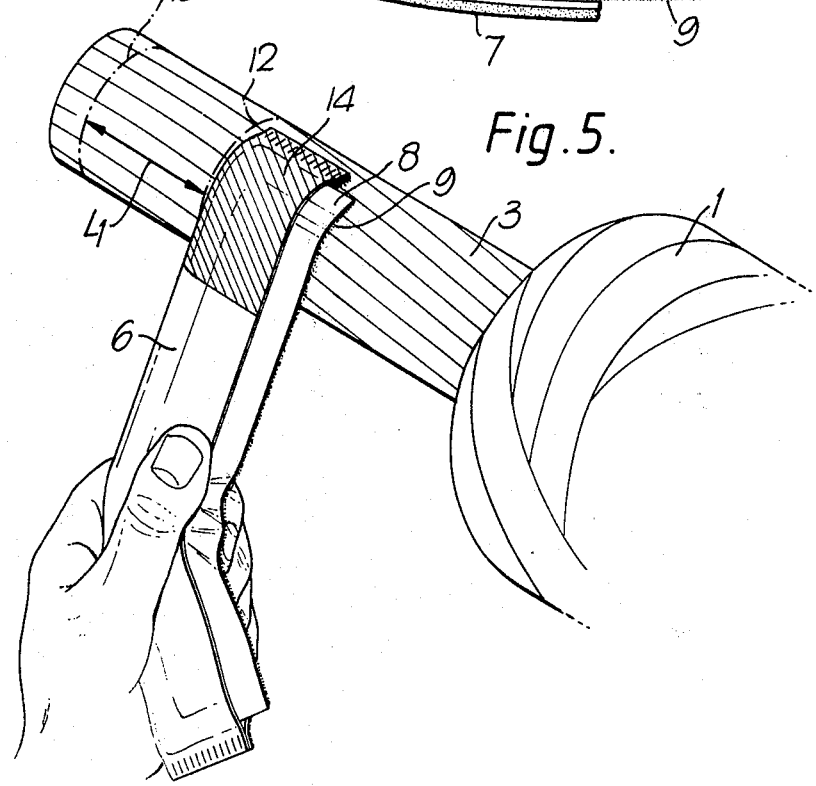
FIG. 5 shows the application of the V-strip of FIGS. 3 and 4 to a cable.

FIG. 5 shows the instalment of the V-strip 6 prior to recovery. As shown, the cable 3 is preferably provided with a suitable marking line 12 at a predetermined distance from another line 13 which represents the position of the end of the heat-recoverable sleeve 2 (FIG. 2). Preferably the distance between lines 12 and 13 is from 1 to 3 times the width of the V-strip. The V-strip 6 is itself preferably marked at 14 so as to indicate the necessary degree of overlap. The zone 14 may, for example, be coloured.

The width of the V-strip 6 is typically from 30 to 60 mm and the siliconed foil 8 preferably projects a further 20 to 40 mm beyond the lower edge thereof.

Figure 6:
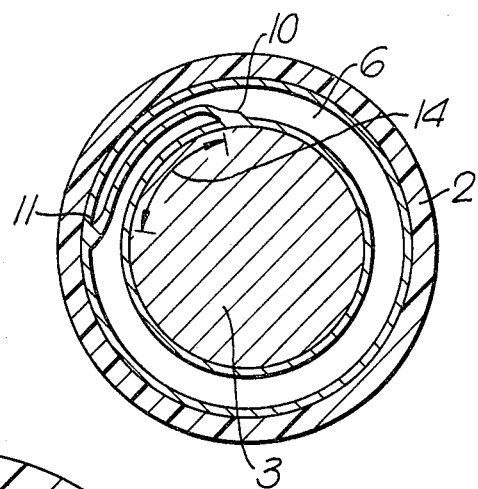
FIG. 6 is a transverse cross-section along the line β—β of FIG. 2.
Figure 7:
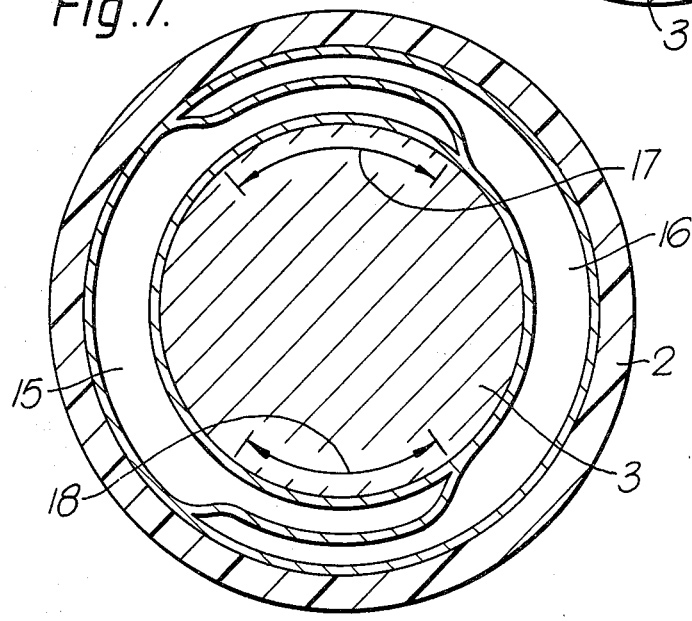
FIG. 7 is a similar cross-section to that shown in FIG. 6.

FIG. 6 shows the position of a single V-strip in cross-section on the line β—β of FIG. 2, and in FIG. 7 there is shown how, for a large diameter cable, there may be employed two V-strips 15 and 16 which overlap in areas 17 and 18.

Figure 8:
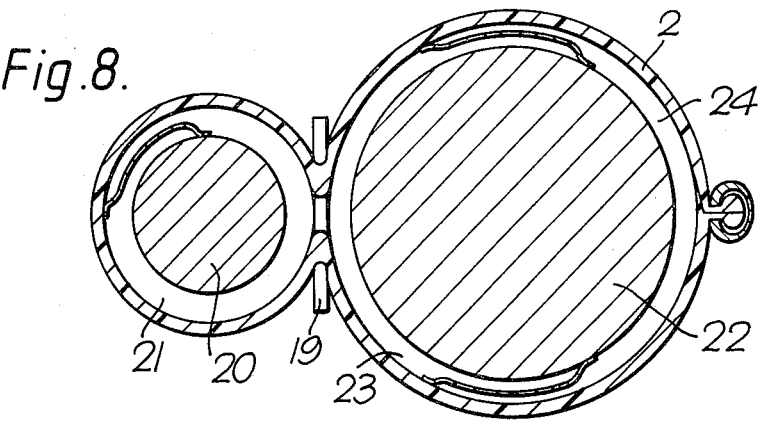
FIG. 8 is a transverse cross-section taken through a break-out splice.

FIG. 8 shows how the V-strip may be employed at a branch-off cable termination employing a clip 19 in accordance with the teachings of British Patent Applications Nos. 79.11713 and 79.11714. As can be seen the smaller branch-off cable 20 is provided with a single V-strip 21 whereas the larger main cable 22 is provided with two overlapping V-strips 23 and 24.

Figure 9:
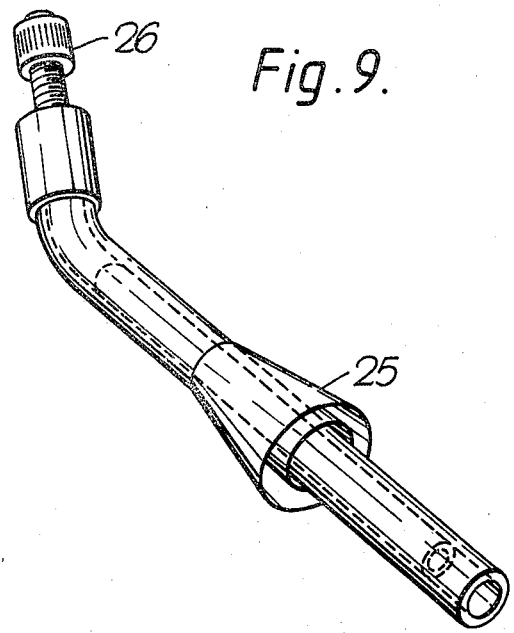
FIG. 9 shows an application for a tubular V-strip.

FIG. 9 shows how a pre-installed tubular V-strip 25 may be used in conjunction with a valve member 26. This valve member may, for example, be that used to pressurise the splice case.

Figure 10:
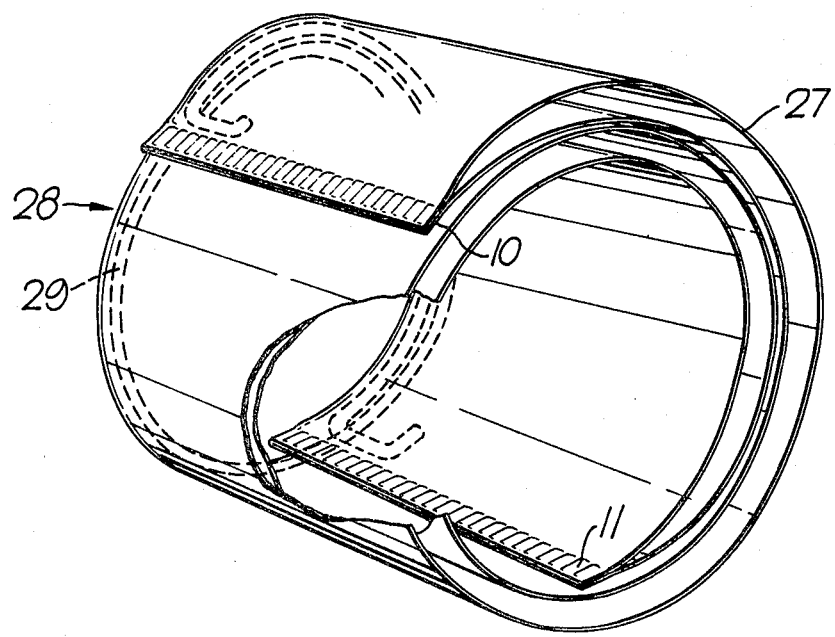
FIG. 10 shows a further form of V-strip provided with a spring component.

FIG. 10 shows a further form of V-strip 27 which in this case is provided at its base 28 with a spring component 29 which is pre-installed, preferably with an overlap of 0.75 turns, and which operates to grip the V-strip firmly in place on a substrate such as a cable prior to recovery.

We claim:

1. A casing for a pressurized segment of an elongate substrate, comprising
a sleeve positionable about the substrate segment to define an enclosure thereabout, said sleeve tapering at the ends thereof to meet the substrate when said sleeve is assembled with the substrate; and
an auxiliary member positionable about the substrate between the substrate and said sleeve at the region where the substrate and said sleeve meet, said auxiliary member being of flexible sheet material having inner and outer arms in cross-section defining an annular channel with the concavity of said channel facing the interior of said enclosure and adapted to allow said channel to open out responsive to pressure within said sleeve, the inner and outer arms of said channel being bondable to the substrate and said sleeve respectively.

2. The casing of claim 1 wherein said sleeve is heat recoverable.

3. The casing of claim 1 wherein said inner arm of said channel includes bonding material capable of bonding to the substrate.

4. The casing of claim 3 further including additional bonding material positionable between said outer arm of said channel and said sleeve.

5. The casing of claims 3 or 4 wherein said bonding material is hot-melt adhesive.

6. The casing of claims 3 or 4 wherein said bonding material is mastic.

7. The casing of claim 1 wherein said auxiliary member includes spring means within said channel for holding said auxiliary member in position wrapped about the substrate.

8. The casing according to claim 1 wherein said inner and outer arms are affixed to one another at the ends of said auxiliary member.

9. The casing of claim 1 further including a strip extending substantially the length of said auxiliary member, being positioned in said channel and extending outwardly therefrom, said strip preventing the bonding of said inner and outer arms together.

10. The casing of claim 9 wherein said strip includes bonding material on one side thereof and a nonstick surface on the other surface thereof.

11. The casing of claim 1 wherein said auxiliary member is of heat-shrinkable material.

12. A casing for a pressurized segment of an elongate substrate comprising
a sleeve positioned about the substrate segment to define an enclosure thereabout, said sleeve tapering at the ends thereof to meet the substrate;
an auxiliary member positioned about the substrate between the substrate and said sleeve at the region where the substrate and said sleeve meet, said auxiliary member being of flexible sheet material having inner and outer arms in cross-section defining an annular channel with the concavity of said channel facing the interior of said enclosure and adapted to allow said channel to open out responsive to pressure within said sleeve, said inner arm of said channel being bonded to the substrate and said outer arm of said channel being bonded to said sleeve.

13. The casing of claim 12 further including a second auxiliary member at the opposite corresponding position of said casing.

14. The casing of claim 12 further including a strip positioned in said channel, extending substantially the length thereof and extending outwardly of said channel, said strip having bonding material on a first side thereof.

15. The casing of claim 14 wherein said strip has a second surface, said second surface being resistant to bonding.

16. The casing of claims 14 or 15 wherein said first surface is juxtaposed with said inner arm and said substrate.

17. The casing of claim 16 wherein said bonding material is contact adhesive.

18. A casing for a pressurized segment of an elongate substrate, comprising
a sleeve positionable about the substrate segment to define an enclosure thereabout, said sleeve tapering at the ends thereof to meet the substrate when said sleeve is assembled with the substrate; and
an auxiliary strip member positionable by wrapping about the substrate between the substrate and said sleeve at the region where the substrate and said sleeve meet, said auxiliary member being of flexible sheet material having inner and outer arms in cross section defining an annular channel with the concavity of said channel facing the interior of said enclosure and adapted to allow said channel to open out responsive to pressure within said sleeve, the inner and outer arms of said channel being bondable to the substrate and said sleeve respectively.

* * * * *